(12) United States Patent
Wilson et al.

(10) Patent No.: US 7,344,746 B1
(45) Date of Patent: Mar. 18, 2008

(54) PROCESS FOR THE HYDROGENATION OF HOP RESIN ACIDS

(75) Inventors: Richard J. H. Wilson, Copthorne (GB); Robert J. Smith, Yakima, WA (US)

(73) Assignee: S.S. Steiner, Inc., New York, NY (US)

( * ) Notice: Subject to any disclaimer, the term of this patent is extended or adjusted under 35 U.S.C. 154(b) by 0 days.

(21) Appl. No.: 10/130,515

(22) PCT Filed: Nov. 18, 1999

(86) PCT No.: PCT/US99/27338

§ 371 (c)(1),
(2), (4) Date: May 16, 2002

(87) PCT Pub. No.: WO01/36581

PCT Pub. Date: May 25, 2001

(51) Int. Cl.
*A23L 1/28* (2006.01)
*C12C 3/00* (2006.01)

(52) U.S. Cl. .................. 426/592; 426/600; 426/655

(58) Field of Classification Search ............ 426/592, 426/600, 313, 655
See application file for complete search history.

(56) References Cited

U.S. PATENT DOCUMENTS

| | | | | |
|---|---|---|---|---|
| 3,552,975 | A | 1/1971 | Worden et al. | 99/50.5 |
| 3,558,326 | A | 1/1971 | Westermann et al. | 99/50.5 |
| 4,324,810 | A | 4/1982 | Goldstein et al. | 426/600 |
| 4,644,084 | A | 2/1987 | Cowles et al. | 568/341 |
| 5,013,571 | A | 5/1991 | Hay | 426/600 |
| 5,296,637 | A | 3/1994 | Stegink et al. | 568/341 |
| 5,370,897 | A | 12/1994 | Smith et al. | 426/600 |
| 5,523,489 | A | 6/1996 | Ting et al. | 568/347 |
| 5,600,012 | A | 2/1997 | Poyner et al. | 568/347 |
| 5,767,319 | A | 6/1998 | Ting et al. | 568/347 |
| 5,917,093 | A | 6/1999 | Ting et al. | 568/366 |
| 6,020,019 | A | 2/2000 | Ting et al. | 426/600 |
| 6,198,004 | B1 * | 3/2001 | Maye et al. | 568/341 |

FOREIGN PATENT DOCUMENTS

| | | |
|---|---|---|
| EP | 0 442 621 | 8/1991 |
| EP | 0 442 621 A1 | 8/1991 |
| GB | 1145240 | 12/1969 |
| GB | 2336363 | 10/1999 |
| WO | WO 97/38955 | 10/1997 |

OTHER PUBLICATIONS

*Formation, Measurment and Significance of Lightstruck Flavor in Beer: A Review;* May 1995-*Brewers Digest;* By: J. Templar, K. Arrigan and W.J. Simpson; pp. 18-25.

Efficient One-Step Preparation of the Beer Additive Tetrahydroiso; By: Bruce A. Hay and John W. Homiski; *J. Argic. Food Chem.;* vol. 39, (1991); pp. 1732-1734.

On the Hydrogenation of Humulone, Part II: The Mechanism of the Hydrogenolysis; By: M. Anteunis and M. Verzele (Ghent); In: *Bull. Soc. Chim. Belg.,* vol. 68, pp. 456-483 (1959).

Chemistry and Analysis of Hop and Beer Bitter Acids; By: M. Verzele and D. De Keukeleire; In: *Chemistry and Analysis of Hop and Beer Bitter Acids;* Elsevier Science Publishers B.V., 1991, pp. 92, 93, 129 and 135.

Braker & Mossman in *Matheson Gas Data Book* (Fifth Edition, 1971, Matheson Gas Products, East Rutherford, NJ, USA), quote 0.019 vol/vol at 60 degrees F, 1 atm; By: William Graker and Allen Mossman.

*Chemistry of Hop Constituents, Part XIII, The Hydrogenation Of iso Humulone;* By: Margaret Brown, G.A. Howard, and A. R. Tatchell; pp. 545-551.

On The Hydrogenation Of Humulone; By: M. Verzele and M. Anteunis; Published in: *Bull. Soc. Chim. Belg.,* vol. 68 (1959); pp. 315-324.

* cited by examiner

*Primary Examiner*—Arthur L. Corbin
(74) *Attorney, Agent, or Firm*—Hayes Soloway P.C.

(57) ABSTRACT

A process for the direct hydrogenation of hop resin acids in the absence of a liquid, organic solvent by reacting the hop resin acids which hydrogen in the presence of a noble metal catalyst at a temperature at which the resin acids are sufficiently fluid to allow easy mixing with the catalyst and suitably facilitate the hydrogenation reaction. Alternatively, the necessary fluidity may be achieved at relatively low temperature by subjecting the reactants to a high pressure of $CO_2$ gas such that the quantity of this gas that dissolves into the resin is sufficient to substantially reduce its viscosity. Particularly useful applications for the process are the conversion is iso-$\alpha$-acids to tetrahydroiso-$\alpha$-acids and rho-iso-$\alpha$-acids into hexahydroiso-$\alpha$-acids. The resinous products of the hydrogenation process may be readily converted to aqueous, alkaline solutions suitable for use in brewing beer. The process may also be worked in a continuous manner, wherein hop resin acids in suitably fluid state and under high pressure are contacted with hydrogen gas and the resultant mixture passed over a bed of noble metal catalyst particles. The necessary fluidity is achieved either by heating the hop resin acid or by dissolving $CO_2$ gas into it or a combination of both. The resinous product of the hydrogenation reaction is collected by depressurisation of the fluid exiting the catalyst bed, conveniently causing release of any excess dissolved gas.

18 Claims, No Drawings

PROCESS FOR THE HYDROGENATION OF HOP RESIN ACIDS

This invention relates to the production of hydrogenated forms of hop resin acids, useful for the bittering or foam enhancement of beer. (By hop resin acids we mean the α-acids or β-acids extractable from dried hop cones of the plant *Humulus lupulus*, the isomerised derivatives of α-acids (especially iso-α-acids), and any reduced forms of the aforesaid hop resin acids capable of further hydrogenation by our process (especially including rho-iso-α-acids) and any mixture thereof.). Particularly, it relates to the production of hydrogenated forms of isomerised α-acids, especially tetrahydroiso-α-acids and hexahydroiso-α-acids.

The bitter flavour of beer produced in a traditional fashion is known to derive in the most part from the naturally occurring α-acids (primarily cohumulone, humulone and adhumulone) that are present in the lupulin glands of hop cones. In the traditional brewing process, dried hop cones are added to "sweet" wort and boiled for at least an hour in the brewery kettle. This boiling process extracts the α-acids and converts a portion to the corresponding isomeric forms known as iso-α-acids (primarily isocohumulone, isohumulone and isoadhumulone). It is these latter substances that constitute the major bittering substances present in the beer following fermentation of the boiled wort by yeast. They are also known to be vital components of beer foam. Unfortunately, the utilisation of hop substances in the traditional brewing process is poor, and it is typical for only about 30% of the α-acids present in the hops to appear as iso-α-acids in the beer. However, it was long ago determined that the separate extraction of the α-acids from hops by a non-polar solvent, followed by their chemically induced conversion to iso-α-acids, offered the possibility to greatly increase the efficiency by which beer can be bittered with hops. Nowadays, in a typical modern process, hops are first extracted with liquid or supercritical $CO_2$. The resultant extract contains α-acids, β-acids (primarily colupulone, lupulone and ad(upulone), hop oils and some low molecular weight fats and waxes. The α-acids present in the extract may then be converted to iso-α-acids by the application of heat and alkali in an aqueous suspension, typically in the presence of magnesium ions, which are known to accelerate to isomerisation reaction (see U.S. Pat. No. 5,370,897 to Smith & Wilson). The iso-α-acids so formed may then be separated from the reaction mixture and purified, typically through fractional precipitation steps using a mineral acid to reduce the pH value of the aqueous phase. For commercial purposes, it is usual for the purified iso-α-acids to be converted to the potassium salt form and standardised as a clear, slightly alkaline, aqueous solution at a concentration of about 30%. This solution may then conveniently be used by brewers to directly bitter worts that have already been fermented. The use of such iso-α-acids preparations in this way can improve the utilisation of the original hop α-acids to as much as 80% and, consequently, in most cases is found to substantially reduce the cost of bittering beer.

Although the addition of an iso-α-acids preparation to beer is commonplace, its advantages do not meet the requirements of all brewers. For instance, those brewers who wish to market beer containing iso-α-acids in clear or green glass bottles risk the development of so-called "lightstruck", "sunstruck" or "skunky" flavour if the beer is exposed to sunlight or to certain types of artificial light. This flavour is known to be due to the formation of 3-methyl-2-butene-1-thiol (MBT) via a photolytic reaction between iso-α-acids and naturally occurring sulphur compounds in the beer. (See review by Templar, Arrigan & Simpson in *Brewers Digest*, May 1995, p18-25). MBT has an exceptionally low taste threshold (variously estimated as between about 2 and 300 parts per trillion in beer, according to the nature of the beer and the sensitivity of the individual taster) and its presence is generally considered to be undesirable. The possibility for the occurrence of the photolytic reaction is known to be dependent upon the presence of an isohexenoyl side chain of the iso-α-acids. If the molecular structure of this side chain is modified, for example by the reduction of either the carbon-carbon double bond or the carbonyl group, then MBT can no longer be produced. (Presumably, this is because it is no longer possible to form the 3-methylbutenyl radical that is believed to be the precursor of MBT, forming this objectionable substance via condensation with a free thiol radical). Consequently, various reduced derivatives of the iso-α-acids have been prepared and their properties described. All are bitter, though the intensities of bitterness produced when these compounds are added to beer are demonstrably different. However, in each case, when these compounds are used as the sole source of bittering in a beer, whether independently or as a mixture, it is invariably found that the beer is effectively protected from the formation of lightstruck flavour, providing only that there is no contamination by non-reduced iso-α-acids.

Three reduced derivatives of the iso-α-acids are now commercially available and in use by many brewers. (For a comprehensive summary of methods of manufacture, properties and uses, see *European Brewery Convention Manual of Good Practice, "Hops and Hop Products"*, (1997), Section 5.4.4 (p 93-106), pub. by Getränke-Fachverlag, Hans Carl, Nürnberg, Germany). Specifically, these are: the rho-iso-α-acids, a dihydroiso-α-acids derivative characterised by reduction of the aforementioned side chain carbonyl group (—C=O) to an hydroxyl group (—CH(OH)); the tetrahydroiso-α-acids (characterised by reduction of the aforementioned carbon-carbon double bond (—CH=CH—) to a single bond (—$CH_2$—$CH_2$—) and also be reduction of a carbon-carbon double bone in another, isopentenyl side chain) and the hexahydroiso-α-acids (characterised by reduction of both of the aforementioned carbon-carbon double bonds and the carbonyl group of the isohexenoyl side chain). The properties of these three derivatives are such as to allow the brewer not only to eliminate the possibility of forming lightstruck flavour, but also to usefully modify the foam stability of his beer. Relative to iso-α-acids, rho-iso-α-acids are relatively low in bitterness and have somewhat reduced foam stabilising properties. On the other hand, tetrahydroiso-α-acids are relatively more bitter and their use enhances beer foam stability, even at equivalent bittering level. Hexahydroiso-α-acids are exceptionally foam enhancing but are considered to have a bittering effect that is only a little greater than that of iso-α-acids. Clearly, by judicious use of these compounds, the brewer is able to manipulate two of the important characteristics of beer so as to produce a desired combination of qualities. Hence, it follows that the use of these reduced iso-α-acids is not necessarily limited only to those brewers who seek to produce lightstable beers. Indeed, such is the perceived value of these compounds that the major market for the tetrahydroiso- and hexahydroiso-α-acids is probably created by their primary use as foam enhancing additives to beers that already contain iso-α-acids deriving from conventional addition of hops, hop pellets or extracts to the wort kettle.

Several methods have been described for the production of the reduced iso-α-acids. In the case of the rho-iso-α- acids, all published procedures achieve this product via borohydride mediated reduction of iso-α-acids. For example, Westermann et al (U.S. Pat. No. 3,558,326) showed how the α-acids content of a concentrated hexane extract of hops could be simultaneously isomerised and reduced to form rho-iso-α-acids in the presence of a hot, aqueous, strongly alkaline solution of sodium borohydride. After separation of the hexane to remove hop oils and waxes, the aqueous phase was contacted with fresh hexane and then acidified with sufficient sulphuric acid to force the reduced (rho-)iso-α-acids into the organic solvent phase. The latter phase was then recovered by centrifugation and the hexane removed by evaporation to leave a product containing a mixture of rho-iso-α-acids and unreacted β-acids. In an alternative process, Goldstein et al (U.S. Pat. No. 4,324,810) teach the production of a similar product, this product being prepared in a way that avoids the use of organic solvents (only excepting any such solvent that may have been used to prepare the hop extract that was the starting point for their process). Again, the isomerisation and reduction of the hop α-acids was achieved by dissolution and heating in an alkaline, aqueous solution of sodium borohydride. Such reduction by sodium (or potassium) borohydride of the side chain carbonyl group is very specific and occurs without significant reduction of the carbon-carbon double bonds.

Tetrahydroiso-α-acids have been produced by several, substantially different processes and from different hop resin acid substrates. Worden & Todd (U.S. Pat. No. 3,552,975) describe a process for the formation of desoxytetrahydro-α-acids via catalytic hydrogenolysis and hydrogenation of β-acids (a by-product of the production of iso-α-acids) using hydrogen gas and a palladium on carbon or other noble metal catalyst. These intermediates are then subjected to a process of oxidation by peracetic acid, followed by isomerisation of the resultant tetrahydro-α-acids to form the tetrahydroiso-α-acids. Their process uses substantial quantities of organic solvents and risks leaving undesirable residues of these solvents in the final product. Cowles et al (U.S. Pat. No. 4,644,084) improve upon this process by oxidising the desoxytetrahydro-α-acids in alkaline, aqueous alcohol with an oxygen containing gas stream, but this variant method is still complex and also requires the use of substantial amounts of ethanol. However, it does also achieve isomeristaion of the intermediate tetrahydro-α-acids in the same process step. The formation of tetrahydroiso-α-acids from α-acids, rather than from the less valuable α-acids, is an inherently easier task. For example, Verzele & Anteunis (in *Bull. Soc. Chim. Belg.,* Vol. 68, (1959), p 315-324) described a simple, laboratory scale process in which humulone, previously separated from a hop extract, was hydrogenated in methanol to tetrahydrohumulone by exposure to hydrogen gas in the presence of a platinum oxide catalyst. Brown, Howard & Tatchell (*J. Chem. Soc.* (1959), p 545-551) separately showed how such a tetrahydro-α-acid (in their case, tetrahydrocohumulone,) could then be isomerised by application of heat and ethanolic alkali to form the corresponding tetrahydroiso-α-acids. The alternative possibility of first isomerising an α-acid and then subjecting it to catalytic reduction by hydrogen gas in an organic solvent to produce a tetrahydroiso-α-acid derivative was also described in this paper. However, the best yield reported for the hydrogenation (of isohumulone) was only 70%, and it was clear from this work that there was a tendency either for incomplete reaction (leading to substantial formation of dihydroisohumulone) or perhydrogenation (as indicated by the formation of neo-hydroisohumulone).

Indeed, according to Hay & Homiski (in *J. Agric. Food Chem.* Vol. 39, (1991), p 1732-1734) the prior art up until the time of writing had indicated that production of tetrahydroiso-α-acids in good yield by direct hydrogenation from pre-isomerised α-acids had never been achieved. Nevertheless, Hay demonstrated (U.S. Pat. No. 5,013,571) that an efficient conversion was, in fact, possible and could be achieved over a Pd/C catalyst, whether in aqueous, aqueous alcoholic or chlorinated hydrocarbon solution. Poyner et al (U.S. Pat. No. 5,600,012) also teach the direct hydrogenation of iso-α-acids, restricting their process to dissolution in pure ethanol and in the presence of specific catalysts based on palladium oxide (as opposed to palladium metal) that were not prone to induced perhydrogenation of the substrate. Importantly, Hay also claimed in his patent that it was possible to achieve both the isomerisation and the hydrogenation in a single step by exposing the α-acids to hydrogen and noble metal catalyst in such a solution, provided that the temperature was above about 50° C. Thus, Hay was able to demonstrate for the first time the possibility to form tetrahydroiso-α-acids in a purely aqueous environment, though he failed to demonstrate the subsequent separation of this product from the reaction mixture without the aid of added alcohol.

The earlier work of Anteunis & Verzele (in *Bull. Soc. Chim. Belg.,* 68, 456-483 (1959)) showed that the direct reduction of α-acids to tetrahydro-α-acids, especially under acidic conditions, was accompanied by the formation through hydrogenolysis of substantial amounts of humulohydroquinones, these being substances of no known value in brewing. Subsequently, Stegink, Guzinski & Todd (U.S. Pat. No. 5,296,637) claimed that the occurrence of hydrogenolysis and the difficulty of preventing perhydrogenation had ensured that "the art has not been able to utilize α-acids as a source of tetrahydrohumulates, with subsequent isomerization to tetraisohumulates". However, they were able to demonstrate that these undesirable reactions could be virtually eliminated by hydrogenating the α-acids as alkaline metal salts in aqueous or alcoholic solution where the pH value was sufficiently high to effectively ensure the absence of their natural, acidic form. Having achieved the successful hydrogenation of the α-acids. Stegink et al noted that, if desired, tetrahydroiso-α-acids could then easily be formed by boiling the tetrahydro-α-acids in aqueous solution at pH 10. Stegink et al also claimed to have demonstrated that their process enabled the production of tetrahydroiso-α-acids having superior purity and in higher yield than was at that time obtained commercially from hydrogenation of iso-α-acids, presumably by application of the Hay process. Particularly, they claimed that hydrogenation via their method ensured the absence of perhydrogenation reactions that they demonstrated were liable to occur under the conditions described by Hay, a problem that it has already been noted was later solved by Poyner et al, though only by restriction of their process to the use of the palladium catalyst in a specific, oxidised form. As we shall later demonstrate, it is an advantage of our invention that this restriction to the use of palladium oxide catalysts in order to avoid perhydrogenation is, in our process, found to be unnecessary.

Two fundamental approaches have been taken to devising processes for the formation of hexahydroiso-α-acids. First described, was the use of tetrahydroiso-α-acids as the starting point wherein the desired formation of the hexahydroiso-α-acids was achieved by a borohydride reduction of the tetrahydroiso-α-acids. Thus, Worden & Todd (U.S. Pat. No. 3,552,975) described how potassium borohydride was added to an alkaline solution of tetrahydroiso-α-acids (previously prepared from β-acids) and the mixture allowed to react for several hours at room temperature. The resultant hexahydroiso-α-acids were then recovered by acidifying the solution and extracting the hop resin acids into dichloromethane. The solvent was then dried over sodium sulphate and finally evaporated away so as to obtain the hexahydroiso-α-acids as a solvent free, pale yellow gum. By processing from tetrahydroiso-α-acids, Worden and Todd were, of course, effectively also demonstrating the possibility to synthesise hexahydroiso-α-acids from either the α-acids or the β-acids of hops (though they did not in fact themselves demonstrate the complete synthesis from α-acids). Much later, Hay (U.S. Pat. No. 5,013,571) demonstrated that hexahydroiso-α-acids could also be formed from α-acids by a reversal of the necessary reduction stages. Thus, Hay describes how rho-iso-α-acids were successfully hydrogenated in ethanol over a 10% palladium on carbon catalyst. In a variant of his process, Hay also showed how an aqueous, alkaline methanolic solution of α-acids could be reduced to (primarily) hexahydroiso-α-acids in a single reaction stage by reacting the α-acids with alkaline borohydride by heating in the presence of hydrogen gas and the same 10% Pd/C catalyst.

As may be seen, the hydrogenation processes described above depend upon the use of conventional organic and/or aqueous solvents in one form or another. Clearly, the use of (protic) solvents during the hydrogenation of iso-α-acids under alkaline conditions as in the process of Hay is an absolute requirement since the iso-α-acids must be presented to the catalyst in an anionic form. Although the process of Poyner et al relies upon maintenance of the un-ionised, acidic form of the iso-α-acids, nowhere do they suggest that catalysis can be successful without the prior dissolution of the substrate into organic solvent (in their case restricted to alcohol).

In their natural, acidic state, hop resin acids are essentially insoluble in water unless the pH is raised by, for example, addition of an alkali metal hydroxide. As the acid resin is converted into salt form, so the solubility increases, reaching a maximum when the pH value exceeds the $pK_3$ of the hop acid by at least 3 pH units. Conversely, as the pH of a concentrated solution is reduced by, for example, addition of a mineral acid such as sulphuric or hydrochloric acid, the hop acid will be progressively precipitated from the solution. Thus, for example, whilst in commercial practice iso-α-acids are typically sold as a 30% (w/v) clear, aqueous solution of their potassium salts at a pH value of between 9.0 and 10.0, reduction of the solution pH to below 4.0 by addition of a mineral acid will cause precipitation of most of the hop acid as a somewhat mobile liquid, and further reduction to below pH 2.0 will cause almost total precipitation to occur. This principle is known to be used in commercial practice during the manufacture of iso-α-acids and results in the formation of a concentrated iso-α-acids resin that is typically about 90% pure iso-α-acids, the remainder being mostly resinous, organic acid by-products. Dependent upon temperature, an incompletely purified hop resin acid, typically containing a mixture of homologues (and possible stereoisomers) and in its natural, acidic state, typically has the form of an amorphous solid, a sticky semi-solid paste or a resinous, relatively (to water) viscous liquid. In the latter situation, this phenomenon is often used as a practical means to prepare a concentrate of the hop acid since the precipitated, mobile hop resin acid typically has a different density to that of the aqueous phase and can be readily separated by gravitational means such as centrifugation or even merely by a process of settling and decantation. The temperature at which the transition from solid or semi-solid to variously mobile liquid takes place is dependent upon the exact composition of the hop resin acid. Different, pure isomers of closely related, individual homologues of hop resin acids may have quite different properties in this respect. For example, Verzele and De Keukeleire (in Chemistry and Analysis of Hop and Beer Bitter Acids, Elsevier Science Publishers B.V., Amsterdam/London/New York/Tokyo, 1991, pages 92, 93, 129 and 135) found that, whilst cis-isohumulone had a melting point of 18° C., its diastereoisomer, trans-isohumulone did not melt until the temperature was raised to 65° C. Chemical reduction of these compounds normally raises the melting point: thus, trans-tetrahydroiso-α-acid reportedly melts at 75.5-78° C. and one of the two possible stereoisomers of trans-rho-iso-α-acid, at 80° C. Since the α-acids fraction of hops is invariably found to contain three major and several minor homologues, and their isomerised derivatives have more than one stereoisomeric form, it is only to be expected that, for example, the physical characteristics, in particular the viscosity of different isomerised α-acid resin preparations containing mixtures of homologues and isomers, will be seen to vary according to the variety of hops from which they are made and the processes used for their preparation.

Naturally, the direct hydrogenation of a relatively viscous hop resin acid in its natural, acidic form may be expected to be rather slow and particularly difficult to take to completion. It is known that the rate limiting step in certain hydrogenation reactions is the rate of transfer of substrate(s) (including hydrogen) and product(s) across the boundary layer surrounding the catalyst particles, a parameter that is inversely related to the viscosity of the medium. A similar situation exists within the pores of the catalyst, where the rate of diffusion will also be inversely related to the fluid viscosity. Where the medium is a viscous substrate itself, the reaction may perhaps start at a reasonable rate due to the high substrate concentration, but could be expected at some stage to become progressively slower as the medium itself is converted into the (normally) still viscous product. More commonly in industrial hydrogenation processes though, the over-riding limitation on the achievable reaction rate is the inadequate availability of hydrogen gas to the active sites on the surface and within the pores of the catalyst particles. Such limitation can be due to inherent low solubility and poor dissolution of the hydrogen gas into the liquid medium resulting in a rate of transfer through the boundary layer and within the pores of the catalyst that fails to match the capacity of the active sites to reduce the available substrate. In such cases, it is often found that the intended reaction is partially or wholly replaced by isomerisation reactions that are usually favoured by conditions of hydrogen starvation. The use of special, often expensive, "eggshell" catalysts (where the active sites of the catalyst are restricted to a thin layer surrounding the matrix of the catalyst particle itself) is often recommended as a means to avoid such a situation developing during a hydrogenation. Various, often proprietary methods to induce an extremely vigorous mixing of the hydrogen gas with the liquid medium are commonly employed in another, non-exclusive strategy to maximise the rate at which hydrogen is dissolved, thereby increasing the driving force for the transfer of hydrogen molecules through the boundary layer. This approach to improving hydrogen transfer rates is particular necessary when a hydrogenation reaction is carried out in water, the preferred solvent of the aforementioned Hay process for conversion of iso-α-acids to tetrahydroiso-α-acids, since the solubility of hydrogen in water is quite low (Braker & Mossman in *Matheson Gas Data Book* (Fifth Edition, 1971, Matheson Gas Products, East Rutherford, N.J., USA), quote 0.019 vol/vol at 60° F., 1 atm.). In such a situation, reactions can be accelerated (and the possibility of unwanted alternate reactions reduced) by increasing the pressure of the hydrogen. However, such a course of action not only requires the provision of a more expensive reaction autoclave, but may also have the disadvantage that the reaction is harder to monitor and control because of the excess of hydrogen necessarily supplied and the relatively small change in the measured gas pressure. In the case of the hydrogenation of hop resin acids, this inevitably increases the possibility of inducing undesirable perhydrogenation of the substrate. The higher pressure of hydrogen also increases the potential for encountering a dangerous leak of highly flammable gas and the creation of a potentially explosive atmosphere in the immediate vicinity of the autoclave.

One solution to the problem of insufficient or poor rate of transfer of either or both of the hydrogen and substrate molecules to the active sites of the catalyst has been described by Poliakoff et al in PCT International Publication No. WO 97/38955. These authors teach a process for the hydrogenation of a wide range of functional groups in aliphatic and aromatic organic compounds in which both substrate and hydrogen are dissolved at low, but readily controllable concentrations into a continuously flowing stream of carrier fluid that is under supercritical or near-critical conditions, the mixture so formed then being passed through a sufficient bed of catalyst that the desired hydrogenation reaction is effectively completed during passage of the reaction mixture across the catalyst particles. The product of the reaction can easily be recovered by reducing the pressure of the fluid exiting the reactor sufficiently that the carrier substance is converted into the gaseous state, thereby precipitating the product as a separate liquid or, possibly, solid phase. The two phases may then be discharged into a collection vessel which allows for the retention of the product and discharge of the gaseous phase (including unreacted hydrogen) to atmosphere or into a suitable recycling system. Several carrier fluids are claimed as suitable for the operation of this process, but particularly mentioned are propane and carbon dioxide, the latter substance being especially favoured because of its generally inert and non-flammable nature, thus ensuring that any leakage of fluid from the process is necessarily rendered non-flammable and non-explosive. In liquid form, both of these substances are also known to have very low absolute viscosities, especially when under supercritical conditions rather than as liquids at temperatures below their critical temperatures. Excepting at very high pressures (relative to the critical pressure) their density is somewhat reduced, too. Hence, the rate of mass transfer of solutes in the supercritical medium may be expected to be much faster than is the case in conventional (i.e. non-supercritical) hydrogenation processes of the prior art. And although Poliakoff et al note in the preamble to their application that there had been previous attempts to hydrogenate substances in supercritical fluids, they dismiss these as unsatisfactory, stating (page 4, lines 22-27) that "Accordingly, there is a need for a hydrogenation process which can be effected under conditions such that only small quantities of the organic compound and hydrogen are required in the reaction at any one time, and yet which can be used on an industrial scale for the manufacture of hydrogenated products". Thus, whilst on the one hand Poliakoff et al reportedly solve the problem of mass transfer and, additionally, demonstrate that they readily can control and manipulate the stoichiometry of many possible hydrogenation reactions by varying key parameters such as temperature and the ratio of hydrogen to substrate, they necessarily complicate matters by the requirement to operate their process with a large excess of the carrier fluid.

Subsequent to the work of Poliakoff et al, the further teachings of Hill, Muller and Swidersky (UK Patent Application No. GB 2,336,363) demonstrate by their examples how hop (resin) acids may successfully be hydrogenated by contacting the hop resin acid with hydrogen gas (at a partial pressure of 20 bar) and a palladium on carbon catalyst in the presence of supercritical $CO_2$ (i.e. at a temperature above 31° C. and a pressure in excess of 73 bar). In discussing the working of their process, Hill et al state (page 2) "Normally, the pressure will not exceed 1000 bar, and is typically in the range of 200 to 350 bar" and also add "Preferably, the temperature is above 40° C. and typically around 75° C.". However, despite the use of high pressures, and temperatures significantly above ambient, Hill et al note (page 3): "The hop acids are typically in solution at a loading of about 2.5-5% wt/vol.", thereby confirming a necessity to work with a relatively large excess of solvating fluid.

It is an object of our invention to demonstrate that, most surprisingly, the need to use conventional solvents, including water and organic liquids such as alcohols or hydrocarbons, as carriers for the hydrogenation of iso-α-acids and rho-iso-α-acids in a necessarily dissolved state may be eliminated. Thus, contrary to natural expectations and the implications of prior art, hydrogenation of iso-α-acids and other hop resin acids can be achieved entirely without the use of any conventional solvent, thereby eliminating the necessity for incorporation in a process of a step for subsequent removal of said solvent.

A more particular object of our invention is to provide processes whereby iso-α-acids resin (or rho-iso-α-acids resin) may be directly hydrogenated to form tetrahydroiso-α-acids resin (or hexahydroiso-α-acids resin) of high purity that may be readily converted into a soluble, aqueous form suitable for use by brewers desirous to prepare beers having improved foam characteristics or lightstability.

Our invention provides processes whereby a specific hop resin acid (such term being taken to include mixtures of closely related homologues) or mixtures of such acids are hydrogenated by direct contact with a noble metal catalyst under an atmosphere containing hydrogen gas and in the complete absence of liquid, organic solvents.

Our processes are based in part on ensuring that the hop resin acids are combined with the noble metal catalyst under conditions such that the hop resin acid/catalyst mixture is in a sufficiently fluid state that it may be easily and continuously mixed by any conventional manner of agitation in a closed vessel. This condition may be achieved by different means. In one version of our invention, we first mix the catalyst and hop resin acid(s) in an autoclave that is constructed of, or lined by, a material that is insert towards the hop resin acids or the hydrogenated products of the reaction and then remove any air by purging with a reaction inert gas, optionally followed by application of a vacuum. Next, hydrogen gas is introduced into the vessel, preferably without concomitant agitation of the resin/catalyst mixture. Preferably, the vessel is then isolated from the source of the hydrogen after raising the pressure to an extent calculated to be equal to, or in specific excess of, that which is calculated to provide the necessary quantity of hydrogen to complete the desired reaction. Optionally, there may also be added an amount of a reaction inert gas such as nitrogen or carbon dioxide sufficient to prevent the formation of an explosive mixture in the event of a leakage to atmosphere. The contents of the vessel are then vigorously agitated to facilitate dissolution of the $H_2$ gas into the fluidised hop resin acids. After completion of the reaction, any remaining excess of hydrogen gas is removed by a combination of relieving the internal vessel pressure to atmospheric pressure and displacement with a reaction inert gas such as nitrogen or carbon dioxide. In certain instances, we have found that this process for solvent-free hydrogenation may surprisingly be conducted at ambient temperature. However, particularly when the hop resin acid is rather viscous at room temperature, it may be found more satisfactory to heat the contents to, for example, about 40-70° C. Following completion of the reaction, the resinous product may then be separated from the catalyst by filtration. Optionally, and according to the particular requirements of a customer, the reduced hop resin acid may be converted to a convenient, solubilised and diluted form, for example by addition of water and an alkali metal hydroxide. An alternative and generally preferred method to convert the reduced hop resin acid is to add the solubilising and diluting agent(s) to the catalyst/resin mixture and then to remove the catalyst by, for example, filtration or centrifugation.

Some hop resin acids are particularly viscous at normal room temperature or may even partially crystallise or form a semi-solid paste. In order to facilitate hydrogenation of such substances, an alternative version of our process increases the fluidity of the hop resin acid(s) substrate, thereby enabling the hydrogenation to either take place at a lower temperature than would otherwise be practical because of excessive viscosity of the hop resin acid/catalyst mixture or, alternatively, to have the effect of increasing the rate or reaction at a given temperature. This improvement is achieved by introducing $CO_2$ gas to the autoclave at a sufficiently high partial pressure to force the dissolution of sufficient $CO_2$ into the substrate as to cause the viscosity to be substantially reduced, to or beyond the point at which the degree of agitation within the resin/catalyst mixture is enough to enable the hydrogenation reaction to take place at a convenient rate and facilitated in part by an increase in the solubility of the hydrogen that we believe is caused by the presence of $CO_2$ in the hop resin acid. This pressure of added $CO_2$ gas is, typically, in excess of that which would be required just to ensure that any leakage of gas from the reactor would not be flammable or potentially explosive, but is necessarily insufficient to cause liquefaction to take place should the temperature be below the critical temperature (31.0° C. for pure $CO_2$). Where the selected reaction temperature exceeds the critical temperature, no liquefaction is possible and the pressure may be allowed to marginally exceed the pressure at the critical temperature (1072 psia), but not to the point at which the gas density exceeds that at the critical point (under which circumstances the $CO_2$ may be considered to be in a supercritical condition and capable of dissolving at least a substantial portion of the hop resin acid). In other respects, the reaction conditions may be similar or even the same as for the working of an unmodified process as described above, excepting that it will now be found possible to achieve substantially the same desired effects but at an optionally lower temperature.

The hydrogenated hop resin acid product from either of the above process variants may be subsequently separated from the catalyst by, for example, filtration or centrifugation of the resin/catalyst mixture at or somewhat above whatever temperature the resinous product is found to be sufficiently fluid to facilitate the separation process. In some instances, the clarified product may then be of such a nature as to be found suitable for use by a brewer for addition to wort or beer. More typically though, it will be desired to convert this hydrogenated hop resin acid into a solubilised form, most commonly as an aqueous, alkaline solution of standardised concentration, but optionally as a solution in a food grade solvent such as propylene glycol or ethanol. A convenient, but by no means exclusive method by which the former may be achieved is by suspending the resin in water in a stirred tank at a temperature such that the hydrogenated hop resin acid is in a fluid state and adding an alkali, such as a concentrated solution of an alkali metal hydroxide, until the resin is totally dissolved. The resultant solution of hydrogenated hop resin acids may then used in whatever way the brewer desires to add flavour and/or other characteristics to wort or beer.

In an alternative method for converting the hydrogenated hop resin acid/catalyst mixture into a solubilised form, the conversion of the resinous product into a clarified and standardised solution may more advantageously be achieved by solubilising the resin before separation from the catalyst. In this variant of our process where the end product is to be an aqueous, alkaline solution, the resin/catalyst mixture may conveniently be first suspended and stirred in water at a temperature at which the resin is not excessively viscous and then dissolved by addition of a concentrated solution of an alkali hydroxide such as potassium hydroxide. The catalyst can then be more easily removed from the mixture by filtration or centrifugation than typically would be the case for separation from the hydrogenated hop resin acid in its resinous state. Sometimes, the recovery of the solubilised resin is best if the solution is deliberately made quite dilute before the catalyst is removed. In such a case, the resin may be readily reconstituted by precipitation, and subsequent collection as a separate phase, via the addition to the (stirred) solution of a concentrated mineral acid such as 50% sulphuric acid in sufficient amount as to convert the anionic form of the resin back to its acidic, non-ionised state. Separation of the phases usually will be found to take place after cessation of agitation and it is then an easy matter to recover the resin, only provided that the temperature is kept sufficiently high to maintain the resin in a fluid condition. The desired, aqueous, alkaline solution then may be reconstituted at the correct strength by suspension in water and addition of alkali as previously described in the case of a hydrogenated resin acids product formed by clarification to remove catalyst directly following the hydrogenation reaction. An inherent advantage of including in a process the steps of precipitation, separation and reconstitution of the resin is that the purity of the product may thereby be enhanced since any highly acidic, organic contaminants or by-products of the hydrogenation reaction may be discarded in the aqueous, acidic waste from the separation process.

A further alternative method for the working of our invention allows for the easier stirring of the hop resin acid/catalyst mixture and is especially suitable for working when the hop resin acid has an inherently high viscosity and the hydrogenation autoclave is not capable of containing a sufficiently high pressure to allow the effective use of $CO_2$ gas as a fluidising agent. In such circumstances, it is also convenient, though not limited, to situations where the final product of the process is to be an aqueous, alkaline solution of the hydrogenated hop resin acid. In this variant of our invention, the hop resin acid and catalyst are suspended in water in a hydrogenation autoclave at a temperature sufficient to fluidise the hop resin acid such that it will form mobile globules when the mixture is stirred. The reduction of the stirred suspension is then initiated by supplying hydrogen gas to the headspace of the autoclave in sufficient or excess quantity to supply the necessary amount to enable completion of the reduction reaction(s). Additionally, the headspace may be charged with a reaction inert gas such as nitrogen or $CO_2$ in sufficient amount to suppress the formation of a flammable or explosive mixture should the autoclave leakage gas to the atmosphere or, alternatively, should it be desired to deliberately discharge residual gas to the atmosphere following completion of the reaction. The product of the reaction may be recovered in a number of ways without detriment to the concept and validity of our invention.

It also is possible to hydrogenate hop resin acids on a continuous basis in accordance with another embodiment of our invention. In such embodiment, hop resin acid in a suitably fluid state and containing sufficient dissolved (or partially dissolved) hydrogen to complete the desired reaction is passed over a bed of noble metal catalyst particles such as is described, for example, by Poliakoff et al in PCT International Publication No. WO 97/38955. The desired fluidity is achieved either by raising the temperature of the resin to a sufficiently high degree, or by dissolution into the resin of $CO_2$ gas at high pressure, or by a combination of both of these. In either case, the catalyst bed and all associated pumps and pipework should be maintained at a pressure above that necessary to keep the $CO_2$ dissolved in the hop resin acid and preferably, but not necessarily, also sufficient to dissolve the necessary amount of hydrogen gas. Subsequent to the reaction in the catalyst bed, the hydrogenated, product resin then may be collected at a reduced pressure, at or a little above atmospheric pressure, in order to release the residual gases, including unreacted hydrogen. If desired, the product then may be converted into an aqueous, alkaline solution as earlier described.

Particular embodiments of our invention are made clear by reference to the following examples.

EXAMPLE 1A

Direct Hydrogenation of Iso-α-acids Resin

To a small, stainless steel autoclave (having internal volume of 885 ml) equipped with a PTFE-coated magnetic stirring bar was added 10.4 g of an iso-α-acids resin ("Preparation 1", containing 91.0% iso-α-acids as analysed by HPLC (@ 270 nm) against a DCHA-trans-iso-α-acids standard and having a peak area purity of 92.5%), and 0.552 g of a 10% palladium oxide on carbon catalyst (Johnson Mathey Type A11210-10, containing 48.9% of water ("Catalyst 1"). On a dry weight basis, the catalyst addition was therefore 3.0% of the weight of the iso-α-acids. Air was removed from the vessel by purging with $CO_2$ gas, followed by application of vacuum. Hydrogen gas was then introduced to a pressure of 61 psig as indicated on an attached Bourdon gauge, the autoclave then isolated from the gas supply, and the vessel partially immersed in a beaker containing warm water that was subsequently maintained at 55±2° C. The contents of the autoclave were then magnetically stirred until no further drop in the gas pressure was observed over a 10 min interval (1.8 h). Next, the contents were cooled by immersion of the vessel into a bucket of water at 21° C. The gas pressure was relieved and the headspace purged with $CO_2$ before opening the vessel. An aliquot of the contents was removed and filtered through a glass fibre filter (Whatman GF/F) to remove the catalyst prior to analysis of the resin.

Table 1 shows that the iso-α-acids in the resin were efficiently converted to tetrahydroiso-α-acids having an HPLC peak area purity at 270 nm of 93.2%. Only a trace (0.1%) of the particular intermediate compound dihydroisohumulone was found, indicative of virtually complete hydrogenation of the iso-α-acids. (By dihydroisohumulone is meant the hydrogenated derivative of humulone in which one mole of $H_2$ gas has been incorporated per mole of humulone to reduce the —CH═CH— bond of the isopentenyl side chain to a —$CH_2$—$CH_2$— single bond).

Thus, contrary to the collective teachings of the prior art, the direct hydrogenation of iso-α-acids to tetrahydroiso-α-acids resin in the total absence of organic solvents is achieved.

EXAMPLE 1B

Conversion of Tetrahydroiso-α-acids Resin into Aqueous Solution and Removal of Catalyst Tetrahydroiso-α-acids in their natural, acidic and resinous state are unsuitable for use as such by brewers because they will not be easily dissolved and dispersed into beer. Therefore, for convenience of use by brewers, it is normal commercial practice to present tetrahydroiso-α-acids in the form of a clear, aqueous, slightly alkaline solution of their potassium salts suitable for use as a post-fermentation additive. Most commonly, the content of tetrahydroiso-α-acids in the solution is adjusted to a concentration of 10% (w/w).

This example illustrates how the product of direct hydrogenation of iso-α-acids, prepared in a manner such as is indicated above, is readily converted into a form suitable for use in a brewery.

4.02 g of hydrogenated resin and catalyst mixture was taken from the autoclave of Example 1A after opening the vessel and transferred to a beaker. To this mixture was then added 150 ml of deionised water at 55° C. The contents of the beaker were then stirred with the aid of a magnetic stirring bar to suspend the resin as small globules in the water and 1.0 ml of a 45% (w/w) KOH solution added slowly from a pipette, thereby causing the resin to dissolve. The mixture was then filtered through a glass fibre filter sheet (Whatman GF/F) in a Buchner funnel and a clear, yellow, aqueous solution (pH 11.0) recovered.

Analysis by HPLC showed that this solution (147.3 g) had a concentration of tetrahydroiso-α-acids of 2.31% (w/w), indicating a recovery of tetrahydroiso-α-acids from the hydrogenated resin and catalyst mixture of 99.6%.

TABLE 1

Purity of Reaction Products by HPLC and Spectrophotometry

| Example No. | Purity of THIAA* (HPLC) | % DHIH** | % THIAA (HPLC) / % THIAA (Spectro) | $A_{254\,nm}$/$A_{270\,nm}$ |
|---|---|---|---|---|
| 1A | 93.2 | 0.1 | 0.91 | 1.20 |
| 2 | 89.0 | N/M | 0.85 | 1.21 |
| 3 | 13.3 | 16.0 | — | — |
| 4 | 93.6 | 0.0 | 0.90 | 1.19 |
| 5 | 93.9 | 0.0 | 0.90 | 1.20 |
| 6 | 94.6 | 0.0 | 0.91 | 1.21 |
| 7 | 94.6 | 0.0 | 0.95 | 1.19 |
| 8 | 91.2 | 0.8 | 0.93 | 1.19 |

DHIH = Dihydroisohumulone; THIAA = Tetrahydroiso-α-acids.
*Purity of THIAA = [Area of THIAA peaks × 100]/Total peak area
**% DHIH = [Area of DHIH peak × 100]/Total peak area
N/M = Not measurable due to unknown, interfering contaminants.
(N.B. All HPLC peak detection was at 270 nm)

It is thus seen that by combination of the procedures of Examples 1A & 1B is facilitated a simple and straightforward process for the production of tetrahydroiso-α-acids from iso-α-acids resin without the use of any solvents whatsoever, excepting only of course the water used to finally dilute and dissolve the tetrahydroiso-α-acids.

Modifications to the processes above described may be made that do not detract from the essence of the invention, that is to say, the surprising ability to convert iso-α-acids in their acidic, resinous state to tetrahydroiso-α-acids without the use of any added, liquid organic solvent. For example, the removal of the catalyst could take place by filtration before the addition of water.

EXAMPLE 2

Solvent Free Production of Tetrahydroiso-α-acids by U.S. Pat. No. 5,013,571

In this Example, we demonstrate that the direct hydrogenation of iso-α-acids such as is described in Example 1A is not only readily and satisfactorily accomplished contrary to expectations without recourse to application of excessive and unusual temperatures or pressures of hydrogen gas, but is, in fact, found to be substantially more efficient than the aforementioned prior art of Hay (U.S. Pat. No. 5,013,571) under directly comparable conditions of temperature, pressure and catalyst loading.

36.7 g of an aqueous solution of the potassium salts of iso-α-acids containing 28.0% (w/w) of iso-α-acids at pH 8.3 (approx.) was transferred to the autoclave of Example 1A, followed by the addition of 0.684 g of PdO/C catalyst ("Catalyst 1"). Calculated on a dry weight basis, the proportion of catalyst to iso-α-acids was therefore 3.4% as was the case for the hydrogenation described in Example 1A. Next, the autoclave was purged of air using $CO_2$, quickly followed by application of vacuum. Hydrogen gas was then introduced to a final pressure of 61 psig and the vessel contents immediately isolated and heated in the manner of Example 1A., the temperature of the water surrounding the autoclave being subsequently maintained at 55-56° C. After standing for 3 min., the stirrer was switched on. The falling pressure of hydrogen was monitored and finally stabilised after 2.9 h. The residual $H_2$ gas was then released to atmosphere and the vessel purged as for Example 1A before opening. Examination of the contents indicated that a certain amount of resinous precipitate had formed, probably in consequence of the known lesser solubility of the potassium salts of tetrahydroiso-α-acids than those of iso-α-acids in aqueous solution. Purely for the purposes of analysis, 150 ml of methanol was therefore added to the vessel and the mixture stirred to ensure that all the precipitated resin would be redissolved. The mixture was then filtered through a Whatman No. GF/F glass fibre filter sheet and the resultant clear, yellow solution analysed by HPLC and spectrophotometry. The results (Table 1) showed that hydrogenation in the manner of Hay had produced a product that was inferior to that of Example 1A or 1B, as indicated by a significantly lower purity (89.0% by HPLC) and lower ratio of concentration by HPLC to concentration by (non-specific) spectrophotometry. This was the case even though there was no suggestion of the occurrence of an unacceptable degree of perhydrogenation, as indicated by a favourable $A_{254nm}/A_{270nm}$ ratio of 1.21. (See Stegink, Guzinski & Todd in U.S. Pat. No. 5,296,637).

Thus, it may be seen that even under similar conditions of temperature, pressure and catalyst loading, hydrogenation by the process of the prior art not only takes place at a slower rate than by that of the process of Example 1A, (perhaps because of the aforementioned poor solubility of $H_2$ gas in water), but leads also to the production of a product that is demonstrably less pure. That said, a limitation of the process of Example 1A is a need to operate at a somewhat elevated temperature in order to avoid problems of mixing and separation created by high viscosity at lower temperature. Table 2 shows how the viscosity of iso-α-acids and tetrahydroiso-α-acids alters with changing temperature. It will be seen that in fact it is the product of the reaction that has the higher viscosity. Thus, it may be expected that direct hydrogenation of iso-α-acids at too low a temperature would tend to lead to an incomplete or "tailing" reaction.

TABLE 2

Viscosity of Iso-α-acids and Tetrahydroiso-α-acids (cP)

| | TEMPERATURE (° C.) | |
|---|---|---|
| HOP RESIN ACID | 40 | 65 |
| Iso-α-acids | 175 | 39 |
| Tetrahydroiso-α-acids | 410 | 66 |

The following example illustrates the difficulty of hydrogenating a hop resin acid when the temperature is such that the hop resin acid/catalyst mixture is in an insufficiently fluid state due to its having a relatively high viscosity.

EXAMPLE 3

Direct Hydrogenation of Iso-α-acids Resin at Low Temperature

The autoclave of Example 1A was charged with 10.1 g of iso-α-acids resin ("Preparation 1") and 0.553 g of 10% PdO/C catalyst ("Catalyst 1") giving a catalyst loading of 3.1% of the iso-α-acids content on a dry weight basis. In the manner of Example 1A, air was then purged from the vessel using $CO_2$ gas, followed by application of vacuum. Next, hydrogen was admitted to a pressure of 65 psig. The vessel was partially immersed in a beaker of water at 20° C. and the magnetic stirrer started. After allowing reaction to continue for 2.2 h, the stirrer was turned off, the vessel placed in a water bath at 12° C., and the residual gas pressure (60.2 psig at 20° C.) relieved to atmosphere. An aliquot of the resin and catalyst mixture was then removed, dispersed into methanol by sonication, filtered and the filtrate analysed by HPLC and spectrophotometry. As shown in Table 1, only 13% of the iso-α-acids had been converted to tetrahydroiso-α-acids in this time. The process of Example 1A is therefore seen to be most inefficient when conducted at a reduced temperature such that the viscosity of the resin is much greater. That this reduced reaction rate is not due solely to the commonly recognised effect of temperature on chemical reaction rates per se is demonstrated in our next example, which illustrates an alternative embodiment of our invention that enables hydrogenation to be conducted advantageously at a reduced temperature, typically at or about ambient temperature. It was earlier noted that the problem of inadequate mass transfer has previously been solved by dissolving organic reactants into a carrier gas that is in a relatively dense, near-critical liquid or truly supercritical fluid state. Carbon dioxide in such a condition was mentioned as being a particularly suitable solvent for many organic, catalysed hydrogenation reactions, albeit that the concentration of the reactant is necessarily limited by its solubility in the carrier fluid. This example demonstrates that, surprisingly, mere contact with $CO_2$ in its purely gaseous state can sufficiently reduce the viscosity of an otherwise excessively viscous hop resin acid that its direct hydrogenation can subsequently proceed at a satisfactory rate.

EXAMPLE 4

Direct Hydrogenation of Iso-α-acids Resin at Low Temperature and Under High Pressure of $CO_2$ Gas 10.65 g of iso-α-acids ("Preparation 1") was placed into the autoclave, together with 0.583 g of 10% PdO/C catalyst ("Catalyst 1"). The proportion of catalyst to iso-α-acids was therefore 3.1% on a dry weight basis, being exactly the same as that used for the hydrogenation of Example 3. The vessel was then purged of air, evacuated exactly as per Example 4 and then brought to an internal pressure of 65 psig with hydrogen gas. $CO_2$ gas was then admitted into the autoclave from a laboratory gas cylinder containing liquid CO2 and the pressure allowed to rise to 715 psig before closing the gas inlet valve. The autoclave was then partially immersed into a water bath maintained at only 20° C. The contents of the vessel were magnetically stirred for 22 min, during which time the pressure fell to 700 psig. While the contents continued to be stirred, further $CO_2$ gas was then admitted over a short period until the pressure had risen to 745 psig and the inlet valve was again closed. After a further 25 min, the pressure had fallen to 720 psig at which point it was again manually raised, this time to 730 psig. The stirrer was eventually stopped after a total mixing time of 2.2 h and the pressurized gas vented to atmosphere over a period of several minutes. The vessel was then opened and a sample of the contents withdrawn, diluted into methanol and filtered to subsequent analysis. As shown in Table 1, the original iso-α-acids content of the substrate resin had been efficiently converted to tetrahydroiso-α-acids having a purity (by HPLC) of 93.6% and an $A_{254nm}/A_{270nm}$ ratio of 1.19, indicative of a low level of perhydrogenation. There was no trace of either the original iso-α-acids or of intermediate dihydroiso-α-acids, confirming that the reaction was complete.

Comparison of the results of Examples 3 & 4 demonstrates how direct, solvent free hydrogenated of what may be presumed to be otherwise excessively viscous resin is made achievable by the application of a high pressure of $CO_2$ gas but without the necessity to resort to conditions in which this $CO_2$ gas would be converted into a liquid or supercritical state. Addition of $CO_2$ gas in such a way has the additional benefit of rendering the gaseous phase non-flammable and non-explosive, thereby eliminating the serious risk of fire and ignition-induced explosion that is associated with the use of pure hydrogen gas. While not wishing to be bound by theory, it is believed that, under relatively high pressure— but nevertheless gaseous state conditions—enough of the $CO_2$ gas dissolves into the resin phase to have the effect of sufficiently reducing the viscosity of the resin to enable efficient mass transfer of substrate and product molecules to and from the active sites of the catalyst. Also, it is considered possible that the rate of hydrogenation is further enhanced through an increase in the solubility of $H_2$ gas in the hop resin acid that we suspect may occur as a consequence of the dissolution into it of $CO_2$.

EXAMPLE 5

Direct Hydrogenation of Iso-α-acids Under New Liquefying Pressure of $CO_2$ Gas

This example illustrates that the application of a high pressure of $CO_2$ gas to enhance the fluidity of a hop resin acids/catalyst mixture in the working of our invention may be taken to include temperature/pressure combinations that are subcritical (i.e. <31° C.), yet close to the point at which the $CO_2$ will liquefy.

Substantially in the manner of Example 3, the autoclave was first charged with 10.34 g of Iso-α-acids resin ("Preparation 1") and 0.564 g of PdO/C catalyst ("Catalyst 1"), for a catalyst to iso-α-acids loading of 3.1% on a dry weight basis). The vessel was then purged and evacuated before introducing $H_2$ to a pressure of 65 psig. The pressure was then raised to 800 psig by addition of $CO_2$ gas. The autoclave was immersed into a water bath at 20° C. and stirring commenced. After 1.7 h, the pressure had fallen to a steady value of 755 psig, at which point the stirrer was turned off, the gas pressure relieved to atmosphere and the vessel opened. A sample of the contents was taken, mixed with methanol and filtered for analysis. Results are given in Table 1, from which it will be seen that the product was of very similar quality to that of Example 3, with a low level of perhydrogenation ($A_{254nm}/A_{270nm}$=1.20), no trace of iso-α-acids or dihydroiso-α-acids and an almost identical purity of 93.9% by HPLC.

At 70 F (21.1 C), carbon dioxide exists as a liquid at pressures in excess of about 830 psig (see Braker & Mossman in *Matheson Gas Data Book* (Fifth Edition, 1971, p 91, Matheson Gas Products, East Rutherford, N.J., USA). The reaction conditions of Example 5 (wherein the partial pressure of the $CO_2$ gas was 735 psi) were therefore approaching, though quite definitely below the point at which $CO_2$ liquefies. Clearly, it may be expected that the amount of $CO_2$ gas dissolved into the iso-α-acids resin will increase with increasing pressure. Thus, it is believed that the greater the pressure of added $CO_2$, the greater will be the amount of $CO_2$ gas dissolved, leading to a lower viscosity in the stirred resin (and a possibly faster rate of reaction) at a given temperature.

EXAMPLE 6

Use of Palladium on Carbon as Catalyst for Direct Hydrogenation of Iso-α-acids Resin This Example illustrates the ability of our process to allow the use of a catalyst that is not based upon palladium oxide. This versatility is rather unexpected in view of the teachings of Poyner et al, whose work indicates that only with the use of an unoxidised palladium metal catalyst is it possible to reduce the iso-α-acids in their non-ionic form without incurring a significant and undesirable degree of perhydrogenation.

In the manner of Example 1A, the autoclave was charged with 11.4 g of iso-α-acids resin ("Preparation 1") and 0.571 g of a 10% Pd/C catalyst (Johnson Mathey, Type A21108-10, containing 46.3% water ("Catalyst 2")). The proportion of catalyst added to the actual iso-α-acids was therefore 3.0% (dry weight basis). After purging with $CO_2$ and subsequent evacuation, hydrogen gas was introduced to a pressure of 60 psig. The vessel was isolated and placed in a beaker holding water at 65° C. After waiting for 3 min, The magnetic stirrer was started and the bath temperature maintained at 56±1° C.

The fall in pressure was monitored for 2.4 h, at which point it had stabilised at 42.0 psig. The remaining $H_2$ gas was then discharged to atmosphere, the vessel opened and an aliquot of the reaction mixture taken, dissolved into ethanol for convenience of analysis, filtered and analysed. Results (Table 1) showed that the hydrogenation had passed completely through the intermediate stage of formation of dihydroiso-α-acids, to produce a high purity product (94.6% by HPLC) having a low level of perhydrogenation ($A_{254nm}/A_{270nm}$=1.21).

That this surprising lack of perhydrogenation was not due to limitation of availability of total hydrogen is shown by our next Example, in which a clear excess of hydrogen (i.e. substantially more than two moles of $H_2$ gas) is made available to each mole of iso-α-acids in the substrate resin.

EXAMPLE 7

Direct Hydrogenation of Iso-α-acids Resin in the Presence of Substantial Excess of Hydrogen Gas Substantially in the manner of Example 5, the autoclave was charged with 10.9 g of an iso-α-acids resin (93.6% iso-α-acids by HPLC and having peak area purity of 93.4%, "Preparation 2"), together with 0.571 g of 10% Pd/C catalyst (Catalyst 2) to give a catalyst to iso-α-acids loading of 3.1% on a dry weight basis. Air was removed as per Example 5 and the vessel then charged to 100 psig with $H_2$ gas. The vessel was immersed in a beaker of water at 65° C. for two minutes before starting the magnetic stirrer. The temperature of the water was subsequently maintained at 57±1° C. After 1.7 h the gas pressure had stabilised at 87.7 psig. For convenience of sampling, 200 ml of cold ethanol were added and the contents of the vessel first well mixed by hand and then filtered. Analysis of the clear filtrate (Table 1) indicated complete conversion of the iso-α-acids to tetrahydroiso-α-acids having a purity of 94.6%. Implied absence of a significant content of perhydrogenated compounds was confirmed by the high spectral ratio ($A_{254nm}/A_{270nm}$=1.19).

EXAMPLE 8

Direct Hydrogenation of Iso-α-acids Resin as an Aqueous Suspension

As mentioned supra, for commercial purposes, the most commonly desired final product of the hydrogenation of iso-α-acids to tetrahydroiso-α-acids is not in fact a tetrahydroiso-α-acids resin, but rather an aqueous solution of the potassium salts at a concentration of 10% (w/w). In this example, we show how the objective of ultimate preparation of an aqueous solution of tetrahydroiso-α-acids may be approached in a novel fashion while maintaining the desirable concept and many of the advantages of direct hydrogenation of iso-α-acids resin.

To the autoclave of Examples 1-7 was added 11.0 g of an iso-α-acids resin (Preparation 1), 11.0 ml of deionised water and 0.561 g of 10% PdO/C catalyst (Catalyst 1). The catalyst loading was therefore 2.9% on a dry weight basis. Air was removed by virtue of a purging with $CO_2$ gas followed by application of vacuum. Hydrogen gas was then admitted to a final pressure of 59 psig and the vessel isolated. After brief immersion in water at an initial temperature of 75° C., the magnetic stirrer was activated and the temperature maintained at between 67 and 70° C. After stirring for 1.75 h, the residual pressure was released and an aliquot of the aqueous suspension taken for analysis. In this case, the product was found to have been not quite completely hydrogenated, there being a residual content of dihydrohumulone of 0.8%. (Table 1). Nevertheless, the purity of the tetrahydroiso α-acids was comparable with that of the product of Example 2. Indeed, it was noted that, despite the low (but nevertheless undesirable) content of dihydroisohumulone, the product was still "cleaner" than that of Example 2, where it was not even possible to measure the content of dihydroisohumulone due to substantial interference by other contaminants eluting in the same region of the HPLC chart. That these latter substances are not found to be present to any significant degree in the products prepared according to our new process in any of its variant forms, (as exemplified by the above Examples and as recorded in Table 1), is considered indicative of a further advantage of our process over the prior art.

EXAMPLE 9

Direct Hydrogenation of Rho-iso-α-acids

To the autoclave of Example 1A was added 10.3 g of a preparation of rho-iso-α-acids resin and 0.708 g of 10% PdO/C catalyst (Catalyst 1). Air was removed by purging with $CO_2$ gas and application of vacuum, followed by introduction of hydrogen to a pressure of 61 psig. The vessel was then heated by immersion in a beaker of water at 70° C. After 2 min., the magnetic stirrer was turned on and the water temperature subsequently maintained at between 44 and 67° C. After 2.7 h the pressure stabilised at 48.0 psig, at which time the water temperature was reduced to 23° C. and the remaining hydrogen released to atmosphere. A sample of the vessel contents was sonicated in methanol, filtered and then analysed by spectrophotometry and HPLC. The rho-iso-α-acids were found to have been converted into hexahydroiso-α-acids having an HPLC peak purity of 90.2% (as judged by comparison against the total peak area) and a total concentration of 102% by spectrophotometry.

In our next two examples, we show how our process may be applied to the hydrogenation of a β-acids resin. The purified β-acids fraction of hops is particularly viscous, being a semi-crystalline solid or extremely viscous paste at normal room temperature, and therefore cannot easily be handled unless it is substantially heated, typically to above 50° C. (See e.g. Forrest, Seaton & Moir in U.S. Pat. No. 4,717,580).

EXAMPLE 10

Direct Hydrogenation of β-Acids Resin

The autoclave of Example 1A was charged with 7.11 g of a β-acids resin containing (by HPLC) 81.0% β-acids (of which 41.9% was in the form of colupulone), 6.8% α-acids and 4.0% iso-α-acids, followed by 0.662 g of 10% Pd/C catalyst (Catalyst 2), giving a catalyst to β-acids loading of 6.2% on a dry weight basis. The autoclave was then partially immersed in hot water to fluidise the resin. The air was then purged from the vessel with $CO_2$ gas, followed by application of vacuum. Hydrogen was then introduced to a pressure of 65 psig and the vessel isolated. After 3 min., the magnetic stirrer was activated and the water temperature maintained at 71±1° C., prior experimentation having established that it was not possible to stir the β-acids resin in the autoclave (whether or not in the presence of hydrogen) unless the temperature was substantially raised above ambient conditions. The falling pressure of hydrogen was monitored and the uptake of $H_2$ gas seen to have ceased after 4.0 h, at which time the stirrer was turned off. The gas pressure at this stage was noted to be 56.5 psig, indicating an uptake of 2.0 moles of $H_2$ per mole of β-acids. Following cooling in a water bath at 15° C., the residual pressure was released and the autoclave finally purged with $N_2$ and opened. The reaction mixture was then sampled and the sample dispersed by sonication in methanol and filtered. Analysis of the clear filtrate by HPLC showed that 93% of the original β-acids had been hydrogenated, primarily to hexa- and tetra- derivatives.

Thus, despite the inherently high viscosity of the resin, it was possible to achieve a substantial degree of hydrogenation.

Our next example shows how the hydrogenation of a naturally semi-solid hop resin acid may be further facilitated by the application of a high pressure of $CO_2$ gas at a temperature exceeding the critical temperature (31° C.).

EXAMPLE 11

Direct Hydrogenation of β-Acids Resin Under High Pressure of $CO_2$ Gas

The autoclave of Example 1A was this time charged with 7.21 g of the same β-acids resin described in Example 9. 0.672 g of Pd/C catalyst (Catalyst 2) was added, to give a catalyst to β-acids loading of 6.2% (dry weight basis). The autoclave was then immersed for a short time in water at 52° C. to help fluidise the resin. Next, air was purged out of the vessel in the manner of Example 10 and hydrogen introduced to a pressure of 65 psig. The pressure was then increased to 800 psig by introduction of $CO_2$ gas. The vessel was then partially immersed in water at 52° C. for 3 min. before starting the magnetic stirrer. The temperature was maintained at 45-48° C. for 4.0 h, at which point the stirrer was turned off and the vessel placed in a water bath at 20° C. After gently releasing the gas pressure over a period of 2-3 min., the vessel was opened. The mixture of resinous product and catalyst was then sampled in the manner of Example 9 and analysed by HPLC. This analysis showed that the β-acids had almost completely disappeared (>99.5% reduction), being replaced by a complex mixture of hydrogenated products of which about 50% was in the form of hexahydro-β-acids.

Hence, it was apparent that, by virtue of the addition of a high pressure of $CO_2$ gas, it was possible to hydrogenate a hop resin acids preparation under relatively low temperature conditions at which the resin/catalyst mixture would otherwise have been highly viscous and difficult to stir.

In the following Examples 12A-12F, we demonstrate that the unexpected ability of $CO_2$ gas to facilitate hydrogenation of hop resin acids is not merely a function of applied pressure that could be duplicated with the use of, for example, nitrogen, another, relatively inert, non-flammable gas that is commonly used to reduce or eliminate the risk of ignition of hydrogen that might leak from the reaction vessel.

EXAMPLES 12A-12F

Direct Hydrogenation of Iso-α-acids in the Presence of Reaction Inert Gas

In each of six different hydrogenation runs, 10.0-10.1 g of an iso-α-acids resin (93.8% iso-α-acids by HPLC and having peak area purity of 94.1%, Preparation 3) was placed in the autoclave of Example 1A. Next, 0.451-0.454 g of 10% PdO on carbon catalyst (Catalyst 1) was added and dispersed into the resin by swirling the whole vessel by hand. The vessel was then closed and purged of air by flushing with $N_2$ (for Examples 12E & 12F only) or $CO_2$, followed by application of vacuum. Hydrogen was then introduced to a final pressure of 60 psig. The temperature was maintained at 19° C. by immersion in a beaker of water at that temperature. According to the nature of the particular experiment, $N_2$ or $CO_2$ gas was then admitted as (and if) required to a final pressure as indicated in Table 3. After 3 min., the magnetic stirrer was activated and the resin/catalyst mixture stirred at the same speed controller setting. After 2.0 h, the pressure was relieved to atmosphere, the vessel opened and an weighed aliquot of the contents dissolved into methanol and analysed by HPLC. Results are given in Table 3.

TABLE 3

Effect of Reaction Inert Gas Pressure on Hydrogenation of Iso-α-acids Resin

| Example No. | Inert Gas Added | Partial Pressure of Inert Gas (psi) | % Conversion of IAA to THIAA* |
|---|---|---|---|
| 12A | None | 0 | 8 |
| 12B | $CO_2$ | 300 | 69 |
| 12C | $CO_2$ | 550 | 100 |
| 12D | $CO_2$ | 700 | 100 |
| 12E | $N_2$ | 700 | 8 |
| 12F | $N_2$ | 700 | 9 |

*% Conversion = THIAA × 100/[THIAA + IAA + DHIH]

As may be seen from Table 3, the poor hydrogenation of iso-α-acids at ambient temperature in the particular circumstances of Example No. 12A was clearly much improved when $CO_2$ gas was added. At a partial pressure of 300 psi of $CO_2$ gas (Example 12B), the conversion of iso-α-acids to tetrahydroiso-α-acids was increased from a commercially useless value of a mere 8% to 69%, whilst at a starting value of 550 psi (Example 12C), the reaction was actually completed within the 2 h time period, as was also the case when the partial pressure of $CO_2$ was set to 700 psi (Example 12D). By contrast, even the application of 700 psi of $N_2$ gas (Examples 12E & 12F) failed to have any significant effect whatsoever on the reaction rate. The results of Examples 12A to 12F clearly indicated that $CO_2$ gas has a high solubility in the iso-α-acids resin, sufficient to be likely to have a substantial effect on the viscosity of the resin and thereby accounting, at least in part, for the considerable improvement in reaction rate that was found to occur. Furthermore, it is believed that the solubility of hydrogen into a hop resin acids/catalyst mixture may be significantly and usefully improved by the presence of a substantial quantity of dissolved $CO_2$ such as may occur when hydrogenation is conducted under a moderate or high (partial) pressure of this generally rather inert gas that is believed to take no direct path in the hydrogenation reaction.

The next example demonstrates that the solubility of $CO_2$ gas under high pressure in a hop resin acid is significant, but limited.

EXAMPLE 13

Solubility of $CO_2$ Gas in Iso-α-acids Resin 76.8 g of an iso-α-acids resin ("Preparation 3") was placed in the autoclave of Example 1A. The autoclave was partially immersed in a water bath at 19° C. Air was removed from the autoclave by purging with $CO_2$ and the vessel isolated. Further $CO_2$ gas was then slowly introduced into the autoclave, over a period of 7 minutes, until the pressure reached a value of 700 psig. The inlet valve was then closed, isolating the autoclave from the pressurized supply tank. After 3 minutes, stirring of the resin was initiated using a Teflon-coated stirring bar. The temperature of the water bath was maintained at 19° C. It was observed that, after 1.3 h., the $CO_2$ pressure had stabilized at 601 psig, whereas in a previous, control experiment conducted in the absence of any iso-α-acids resin, the $CO_2$ pressure had decreased from 700 psig to 681 psig. Thus, the drop in $CO_2$ pressure due to dissolution of $CO_2$ into the iso-α-acids resin was 80 psi. Using the Ideal Gas Law equation, and making due allowance for the volume occupied by the resin, this difference in pressure drop was calculated to indicate that the amount of $CO_2$ dissolved into the iso-α-acids resin was 10.5% of the mass of the iso-α-acids resin.

Thus, contrary to the aforementioned teachings of Poliakoff et al and of Hill et al, we have found that hydrogenation in the presence of carbon dioxide may be conducted efficiently under circumstances wherein the $CO_2$ is present not as a rather poor solvent for the hop resin acids, but rather as an aid to working that enables hydrogenation of hop resin acids to take place in a highly concentrated form and at a relatively low temperature, often below the critical temperature for $CO_2$ or even below that at which the hop resin acid may normally be regarded as in a fluidised state, this being typically achieved by the application of a pressure of $CO_2$ gas that is below, or even substantially below the critical pressure for this gas.

The following Examples 14A-14C demonstrate how the process of our invention may be used to prepare an aqueous solution of a hydrogenated, isomerised hop resin acid at a commercially acceptable concentration and suitable for the beneficial enhancement of beer foam.

EXAMPLE 14A

Direct Hydrogenation of Iso-α-acids Resin 10.1 g of an iso-α-acids resin (93.8% iso-α-acids by HPLC, "Preparation 3") was placed in the autoclave of Example 1A together with 0.453 g of 10% PdO/C catalyst (Catalyst 1) to give a catalyst to iso-α-acids loading of 2.4% on a dry weight basis. Air was removed from the vessel by purging with $CO_2$ followed by application of vacuum. Hydrogen gas was then allowed into the vessel until the pressure reached 60 psig. The resin/catalyst mixture was then heated by adding water at 65° C. to a beaker in which the autoclave was partially immersed. After 3 minutes, the magnetic stirrer was started and the water temperature maintained at between 53 and 56° C. After stirring for 1.7 h, the hydrogen pressure stabilized at 44 psig. The autoclave was then put into a water bath at 15° C. and the pressure released to atmosphere. After opening the vessel, an aliquot of the reaction mixture was removed, sonicated in methanol, filtered and then analysed by HPLC. A second aliquot was filtered directly to remove the catalyst (using a Whatman GF/F glass microfibre filter) before dilution into methanol. These aliquots had nearly identical purities (94.5% and 94.7%, respectively). Each sample had a very low level of perhydrogenation as indicated by the high spectral ratio ($A_{254nm}/A_{270nm}=1.21$).

This example shows how the tetrahydroiso-α-acids produced by solvent-free hydrogenation of iso-α-acids and recovered by direct filtration of the resin/catalyst mixture in the manner of Example 1A may be achieved without loss of purity or a need for prior dissolution into a solvent.

EXAMPLE 14B

Formation of an Aqueous Solution of Tetrahydroiso-α-acids

To 6.88 g of the hydrogenated iso-α-acids/catalyst mixture from example 14A was added 250 ml of deionized water at 60° C. and the mixture stirred. 45% KOH solution was then added slowly until the pH reached 11.5 and the resinous fraction was dissolved (1.56 ml of 45% KOH). The entire mixture was then filtered through a glass microfibre filter (Whatman GF/F). 243 g of a pale yellow, aqueous filtrate was obtained, having a concentration of tetrahydroiso-α-acids of 2.47% by HPLC. The recovery of tetrahydroiso-α-acids from the catalyst was thence calculated to be 98.1%. Next, the filtrate was warmed to 60° C., stirred, and 3.2 ml of 50% $H_2SO_4$ added to bring the pH to 1.7, causing the tetrahydroiso-α-acids to precipitate as a mobile resin. After allowing the mixture to stand for about 40 min. in a separatory funnel, the lower resin phase was collected and the residual carbon catalyst removed by filtration through a coarse filter paper (Whatman No. 4). To 4.70 g of the filtered, tetrahydroiso-α-acids resin was then added 33 ml of deionized water at 40° C. The mixture was stirred and 5.25 ml of 9.0% KOH added to completely solubilise the resin at a pH of 9.5. Finally, the concentration of tetrahydroiso-α-acids was adjusted to 10.2% (UV Spectro analysis) by addition of water. By HPLC, this final product had a concentration of tetrahydroiso-α-acids of 9.6% and was of an unusually pale (yellow) colour, indicating a relatively low level of the unknown, chromophoric compounds that normally contaminate commercial preparations of reduced, isomerised iso-α-acids. The HPLC purity was 94.4%.

Thus, the preparation of an alkaline, aqueous, potassium salts tetrahydroiso-α-acids product of high quality at the usual commercial strength (10% w/w by UV Spectro) is readily achieved from a tetrahydroiso-α-acids resin made by direct hydrogenation of iso-α-acids resin.

EXAMPLE 14C

Enhancement of Beer Foam by Addition of Solubilised Tetrahydroiso-α-acids

The tetrahydroiso-α-acids solution of Example 14B (10.2% w/w by UV Spectro analysis) was further diluted in water to a concentration of tetrahydroiso-α-acids (by UV Spectro analysis) of 3.55 mg/ml. To each of two 12 oz bottles of beer (Bud Light) were then added 0.75 ml of this solution (to give a total concentration of tetrahydroiso-α-acids in the beer of 7.5 ppm). The bottles were then recapped and refrigerated for 3 days. Similarly, two bottles of beer were treated with a commercially available tetrahydroiso-α-acids product and another two bottles with an isomerised extract consisting of an aqueous solution of the potassium salts of iso-α-acids. These bottles of beer were tested for relative foam stability by the method of Smith & Wilson (PCT International Publication No. WO 93/02177). The results of these tests are presented in Table 4.

TABLE 4

Relative Foam Stability of Beers spiked with Iso-α-acids and Tetrahydroiso-α-acids

| ADDITION (@ 7.5 ppm) | RELATIVE FOAM STABILITY |
|---|---|
| Commercially Available Iso-α-acids | 1.11, 1.17 (Av. = 1.14) |
| Commercially Available Tetrahydroiso-α-acids | 1.54, 1.55 (Av. = 1.55) |
| Tetrahydroiso-α-acids of Example 14B | 1.63, 1.64 (Av. = 1.64) |

As clearly demonstrated, the product of Example 14B had a foam-enhancing ability that is at least as great as that of the commercially available tetrahydroiso-α-acids product and much greater than that caused by the pro-rata addition of unreduced iso-α-acids, confirming its suitability for use as a post-fermentation, beer foam enhancing agent.

EXAMPLE 15

Use of a Platinum Catalyst

This example demonstrates that our invention is not limited to the use of palladium catalysts, but may be taken generally to encompass the use of any noble metal catalyst found to be suitable for the purpose.

10.2 g of an iso-α-acids resin (93.8% iso-α-acids by HPLC, "Preparation 3") was placed in the autoclave of Example 1A together with 1.167 g of a 5% platinum on carbon catalyst (Johnson Matthey type 18M) to give a catalyst to iso-α-acids loading of 5.9% on a dry weight basis. Air was removed from the autoclave by purging with $CO_2$ followed by application of vacuum. Hydrogen gas was then brought into the autoclave to a final pressure of 60 psig. The resin acid/catalyst mixture was heated by adding water at 65° C. to a beaker in which the autoclave was partially immersed. After 3 min., the magnetic stirrer was started and the water temperature maintained at between 56 and 59° C. After stirring for 2.4 h, the pressure of hydrogen had stabilized at 43 psig. The autoclave was then placed in a water bath at 13° C. and the internal pressure relieved to atmosphere, following which the residual hydrogen was removed by purging with $CO_2$ and application of vacuum. After release of the vacuum to atmosphere, an aliquot of the reaction mixture was removed, thoroughly dispersed into methanol, filtered and analysed by HPLC. The sample had a purity of tetrahydroiso-α-acids of 93.9%. This purity was quite similar to that obtained using the palladium oxide catalyst of Example 14A. The sample had a low level of perhydrogenation as indicated by the spectral ratio of $A_{254nm}/A_{270nm}=1.19$.

As can be seen from the foregoing, a particular advantage of our new process permits us to conduct catalytic, heterogeneous hydrogenation of hop resin acid substrates, especially of iso-α-acids and rho-iso-α-acids, in the complete absence of conventional organic solvents, allowing only the optional dissolution into the substrate of gaseous carbon dioxide. Surprisingly, we have found that it is possible in this way to achieve desirable and efficient conversion of substrates into hydrogenated products in high yields and at rates that are convenient for the controlled, economic operation of an industrial process. Moreover, our invention may be worked not only as a batch process, but also in a continuous or semi-continuous way, thereby enabling a choice to be made that can take account of other, associated circumstances that may favour one type of operation over another.

Furthermore, as can also be seen from the foregoing, tetrahydroiso-α-acids formed from iso-α-acids by our new process when worked under appropriate conditions would be eminently suitable as a starting material for production of hexahydroiso-α-acids by means of conventional processes.

The invention is susceptible to modification. For example, other ways to achieve the solubilisation of hydrogenated hop resin acids that do not in any way detract from the essence and scope of the invention may be employed.

While the foregoing working examples illustrate preferred embodiments, our invention is not to be limited by restriction to the conditions of the above examples but is rather to be taken to encompass all manner of reactions and circumstances that fall within the broad concepts of our claims.

We claim:

1. A process for the direct hydrogenation of hop resin acids which comprises contacting an undiluted, solvent-free mixture of hop resin acids, in their naturally acidic state, with hydrogen gas in the presence of a noble metal catalyst, wherein the hydrogenation proceeds in the presence of dissolved $CO_2$ gas, the partial pressure of said $CO_2$ gas being (a) sufficient to fluidise said reaction mixture, and (b) below that at which said $CO_2$ gas will liquify at below the critical temperature for $CO_2$, or at a pressure less than that at which the density of $CO_2$ gas exceeds its density value at the critical point if the temperature of the CO2 gas is at or above said critical temperature.

2. The process of claim 1, wherein the noble metal of the catalyst comprises palladium or platinum.

3. The process of claim 2, wherein the palladium is in the form of palladium oxide on carbon or palladium on carbon.

4. The process of claim 1, including the step of heating the hop resin acids sufficiently to fluidise the hop resin acids.

5. The process of claim 1, wherein the product of the hydrogenation reaction is subjected to a separation process to remove the catalyst.

6. The process of claim 5, wherein the separated reaction product is converted into an aqueous solution by the addition of water and an alkali metal hydroxide.

7. The process of claim 6, wherein the alkali metal is potassium.

8. The process of claim 1, including the steps of suspending the hydrogenated hop resin acids product in water, adding sufficient alkali metal hydroxide to dissolve the hydrogenated hop resin acids, and separating the resulting mixture to provide a solution of the hydrogenated hop resin acids product in an alkali metal salt form.

9. The process of claim 8, wherein the alkali metal comprises potassium.

10. The process of claim 8, including the steps of acidifying the solution by addition of mineral acid to precipitate the hydrogenated hop resin acids and recovering precipitated resin as a separate phase.

11. The process of claim 10, including the steps of suspending the recovered resin in water and adding sufficient alkali metal hydroxide to cause the resin to dissolve.

12. The process of claim 11, wherein the alkali metal comprises potassium.

13. The process of claim 1, wherein the partial pressure of the carbon dioxide gas is between 0.4 and 0.9 times the pressure at which the $CO_2$ gas will liquify at a temperature below critical temperature.

14. The process of claim 1, wherein the temperature is between 10 and 100° C.

15. The process of claim 1, wherein the temperature is between 15 and 50° C.

16. A continuous process for the direct hydrogenation of hop resin acids, comprising the steps of converting an undiluted solvent-free mixture of said hop resin acids into a fluid state; supplying hydrogen to the hop resin acids under sufficiently high pressure to form a homogeneous resin acids and hydrogen mixture; passing the so formed homogeneous resin acids and hydrogen mixture through a bed of noble metal catalyst particles and collecting the resulting product at about atmospheric pressure, wherein the hop resin acids are fluidised at least in part by dissolution into said acids of $CO_2$ gas in an amount not exceeding that which will saturate the homogeneous resin acids at the pressure of the resin acids entering and exiting the catalyst bed.

17. The process of claim 16, wherein the hop resin acids are fluidised at least in part by heating.

18. A continuous process for the direct hydrogenation of hop resin acids, comprising the steps of converting an undiluted solvent-free mixture of said hop resin acids into a fluid state; supplying hydrogen to the hop resin acids under sufficiently high pressure to form a homogeneous resin acids and hydrogen mixture; passing the so formed homogeneous resin acids and hydrogen mixture through a bed of noble metal catalyst particles and collecting the resulting product at about atmospheric pressure, wherein the hop resin acids are fluidized at least in part by heating and at least in part by dissolution into said acids of $CO_2$ gas.

* * * * *